May 22, 1934.　　　G. L. BOSSARD　　　1,960,079

CHIME

Filed Aug. 22, 1931　　　7 Sheets-Sheet 1

Inventor

Gisbert L. Bossard

By maréchal & Noe

Attorney

Inventor
Gilbert L. Bossard
Maréchal & Noe
Attorney

May 22, 1934.  G. L. BOSSARD  1,960,079
CHIME
Filed Aug. 22, 1931   7 Sheets-Sheet 3

Inventor
Gisbert L. Bossard
Maréchal + Noe
Attorney

May 22, 1934.  G. L. BOSSARD  1,960,079
CHIME
Filed Aug. 22, 1931   7 Sheets-Sheet 5

Inventor
Gisbert L. Bossard
By Maréchal & Noe
Attorney

May 22, 1934. G. L. BOSSARD 1,960,079
CHIME
Filed Aug. 22, 1931 7 Sheets-Sheet 7

Inventor
Gisbert L. Bossard
Marichal & Noe
Attorney

Patented May 22, 1934

1,960,079

UNITED STATES PATENT OFFICE 1,960,079

CHIME

Gisbert L. Bossard, Dayton, Ohio, assignor to General Kontrolar Company, Inc., Dayton, Ohio, a corporation of Ohio Application August 22, 1931, Serial No. 558,737

9 Claims. (Cl. 84—407)

This invention relates to electrically operated musical chimes and the like.

One object of the invention is the provision of an electrically driven chime of compact and sturdy construction, having solenoid means for operating the chime striker or strikers.

Another object of the invention is the provision of a chime, having motor controlled switch means periodically controlled in an automatic manner for controlling the energization of a solenoid which operates the chime striker.

Another object is the provision of an electrically controlled chime of the character mentioned, in which the chime member or members are also adapted to be individually controlled by additional switches.

Another object is the provision in a device of the character described, of a series of motor controlled electrical elements which are controlled individually and selectively as well as by the motor, with provision for rendering the selective and individual control ineffective when the motor is operating.

Another object is the provision of a shaded pole induction disk motor of novel sturdy construction adapted for use in an electrical chime or the like.

Further objects reside in the novel features of construction of the electrically driven chime, and its constituent elements, as will be more fully apparent from the following description, the appended claims, and the accompanying drawings, in which—

Fig. 3 is a top plan view of the chime operating apparatus, corresponding to a section on the line 3—3 of Fig. 1;

Figs. 21 to 24 inclusive refer to a modified form of construction, Fig. 21 showing a front elevation, partly in section, of a single tube chime;

Fig. 24 is a view of the controlling motor circuit as associated with the chime apparatus shown in Fig. 21.

Referring more particularly to the drawings in which preferred forms of the invention are shown, Figs. 1 to 20 inclusive show a chime having a series of chime sounders, 10, 11, 12 and 13, each supported by a chime hanger 15, the several chime hangers being supported from posts 16 provided on the outer side of a supporting plate 17.

As more fully set forth in my prior application for Letters Patent, Serial No. 471,814, filed July 30, 1930, the chime sounders, which are preferably hollow tubes of different lengths productive of musical sounds of different tones, are adapted to be struck successively in some desired order when the chime apparatus is energized. For example, the chime may be so designed, upon being started, as to strike the notes of the Westminster chimes. The switch controlling the energization of the apparatus, or the starting of a series of operations, may be provided in the usual location of a doorbell of a residence so that the chime can be used to indicate when someone is at the door and wants admittance; or other uses may be made of the chime, which may be controlled from any desired point.

The supporting plate 17 on which the chime sounders are hung, as shown, may also support the operating mechanism for the chime. The strikers for the chime tubes are the plungers of electrical solenoids designated generally 20, 21, 22 and 23, supported on the rear face of the plate 17. These solenoids provide passages for the reception of the plungers 24. These plungers are metal elements of such character that they will be drawn endwise of the coil passages when the coils are energized, and thus be forcibly moved against the chime tubes. Normally, however, these plungers are held in a retracted position, as will be more fully explained.

Figure 1:
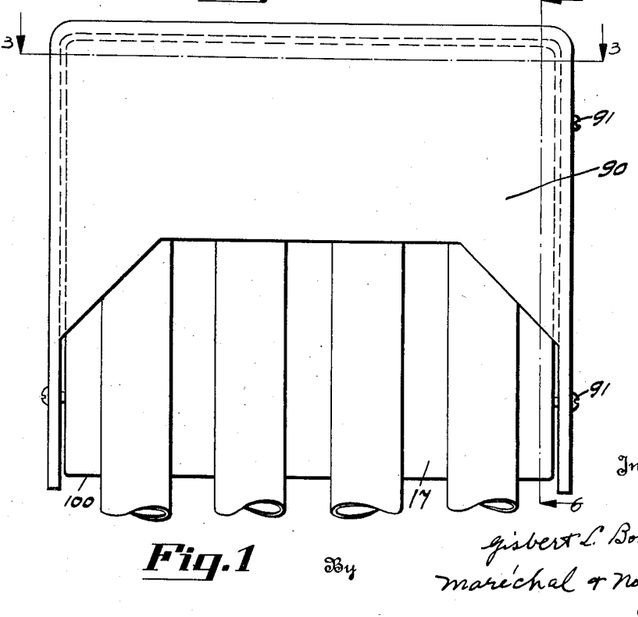
Fig. 1 is a front elevation of a chime embodying the present invention, showing the lower portions of the chime tubes broken away.
Figure 2:
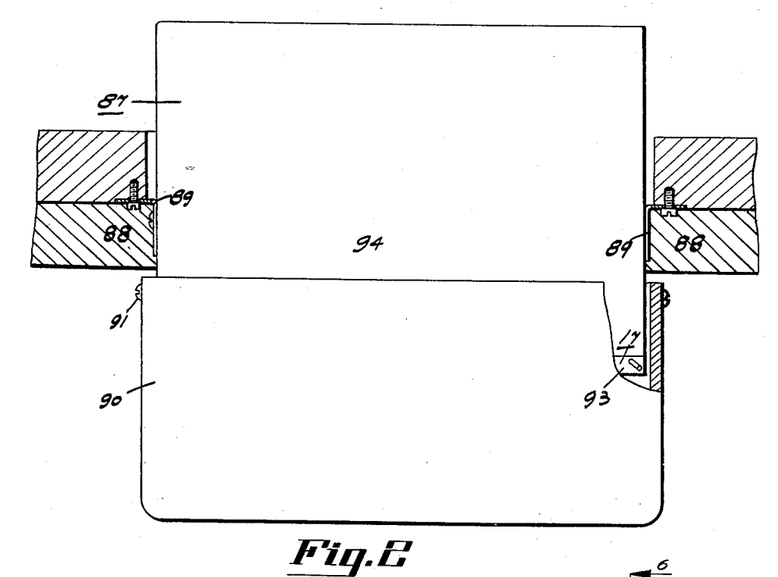
Fig. 2 is a top plan view of the chime shown in Fig. 1.
Figure 4:
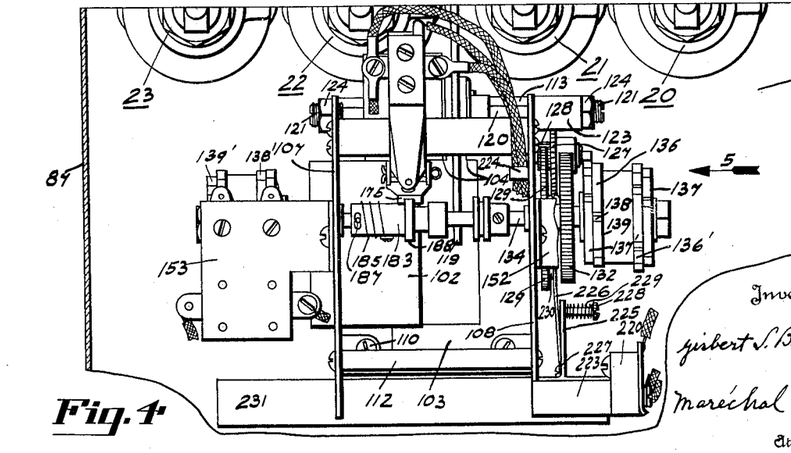
Fig. 4 is a view of the electric motor mechanism as viewed from the rear of the apparatus.
Figure 5:
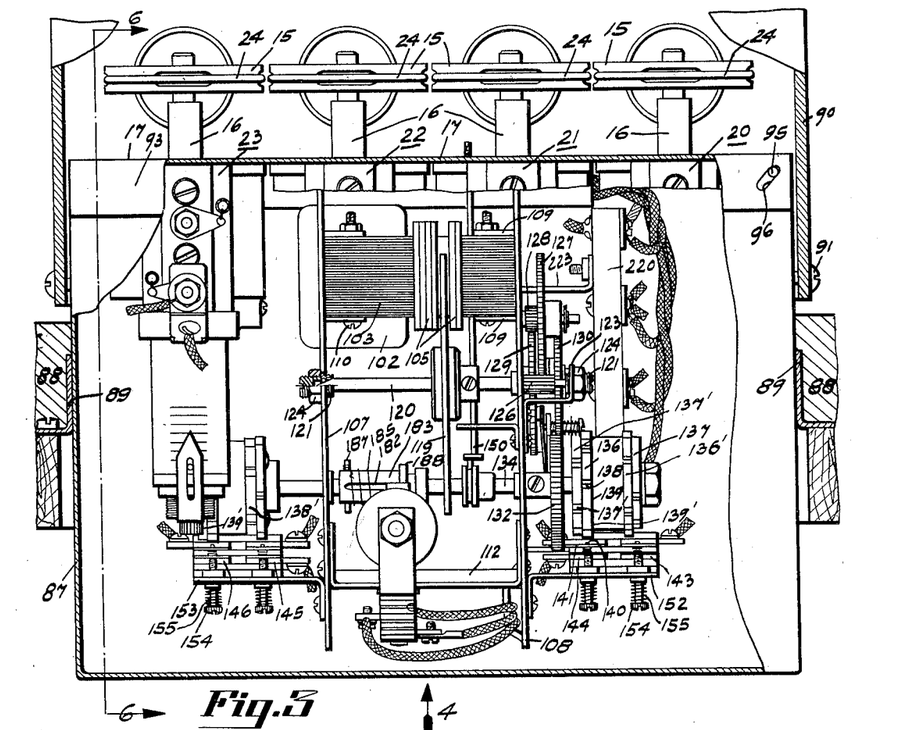
Fig. 5 is a side elevational view of the mechanism shown in Fig. 4.
Figure 6:
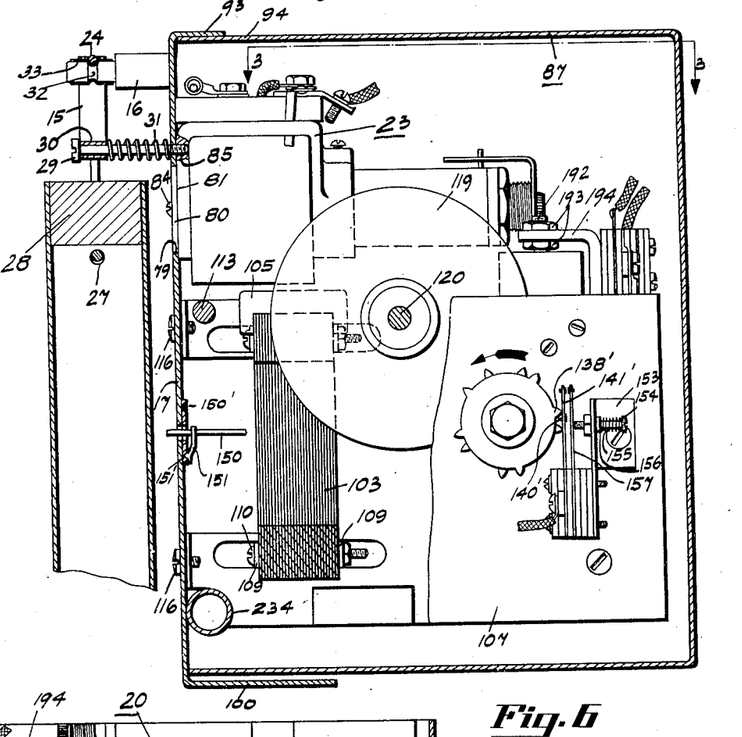
Fig. 6 is a sectional view on the line 6—6 of Fig. 1, also showing the chime tube in section.
Figure 16:
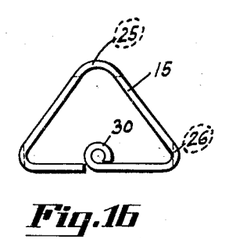
Fig. 16 is a detailed view of one of the chime hangers.
Figure 17:
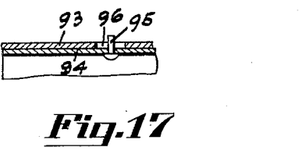
Figs. 17 and 18 are detailed views of the hinge arrangement.
Figure 18:
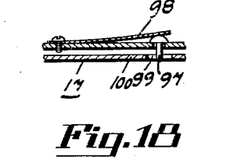

Each chime tube is mounted on a metal triangle 15, as shown in Fig. 16, over which is stretched a flexible suspending cord 24', the cord being received in notches 25 in the top and notches or slots 26 in the sides of the triangle and passing through a transverse hole 27 in the chime tube provided below its top end block or closure 28. The chime tubes are hung so that they will be struck by the plungers a little distance below the top ends of the tubes, the triangles 15 being supported on the posts 16 which are preferably riveted to the supporting plate 17. The chime tubes are thus hung approximately the right distance away from the supporting plate 17, but accurate adjustment in the position of the chime tube with relation to the plate 17 is provided so that the chime tubes may be positioned exactly, by means of adjusting screws 29 which pass through loops 30 in the bottom of the triangles and which are threaded adjustably in the supporting plate 17 and in the forward end of the solenoid core piece. Springs 31 hold the triangles against the heads of the screws. By such means adjustment of the bottom ends of the triangles is provided for while their upper ends may remain in some definite relationship with respect to the plate 17, the cords 24 and the grooves 32 in the posts which receive the cords determining the positions of the upper ends of the triangle. A rubber sleeve 33 is provided around each of the posts 16 to prevent the metal triangle contacting directly with the metal post, as shown in Fig. 6. It will thus be apparent that the chime tubes may be accurately positioned with respect to the supporting plate 17 so that they are struck properly by the solenoid plungers when the solenoid coils are energized.

Figure 7:
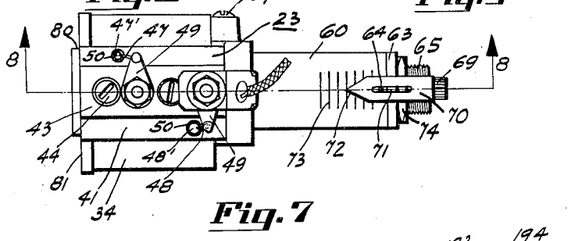
Fig. 7 is a top plan view of one of the solenoids.
Figure 8:
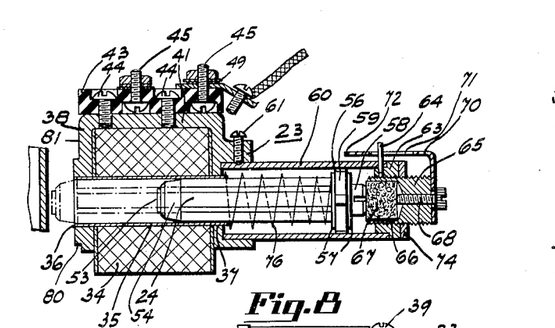
Fig. 8 is a section on the line 8—8 of Fig. 7.
Figure 9:
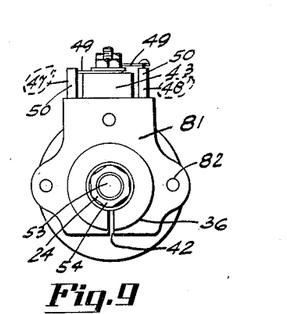
Fig. 9 is an end view of the solenoid.

The solenoids themselves are of novel construction, as shown in Figs. 7, 8 and 9, in which the solenoid 23 is represented. It embodies a coil or winding 34 having a central passage in which is a tube 35 of suitable insulating material, tube 35 going freely through the passage provided in the coil and holding the coil in place. The tube 35 projects at its ends through holes in the two end portions 36 and 37 of the metal solenoid core element 38, which is of some suitable material such as iron so as to provide a flux path for the solenoid, completing the flux circuit exteriorly of the coil 34 and its plunger. A set screw 39 threaded in one of the end portions of the metal core element, the end 37 for example, secures the tube 35 in the core element. The core element has a side portion 41 which connects the two end portions 36 and 37, the cross sectional area and the shape of the portions 41, 36 and 37 being so designed as to provide for substantially the same flux density in the different parts of the solenoid. It will be observed that the end portions 36 and 37 form annular members extending around the central passage provided by the tube 35 and thus complete the magnetic flux path with a minimum air space in this path, so as to give the maximum efficiency and a large force or pull on the solenoid for any given value of current in the coil. The end portions 36 and 37 are slotted as indicated at 42 on the side opposite the side portion 41 so as to interrupt the continuity of the ring form and thus prevent eddy current losses.

On the side portion 41 of the solenoid core element 38 is a connecting block 43 of suitable insulating material, this block being secured in place by screws 44 or the like. The screw portions 45 are provided in the block and form connecting means to which the terminal wires 47 and 48 of the solenoid coil are connected, these wires terminating preferably in connecting plates 49. The terminal wires 47 and 48 project up through holes or passages 47' and 48' in the side portion 41, suitable insulating tubes 50 surrounding the wires where they pass through these holes. The passages 47' and 48' in the side portion of the solenoid core element definitely hold the terminal wires against bending, so that they will not easily become broken, and in addition they serve to locate or hold the coil 34 against any turning tendency within the solenoid core element.

It will thus be apparent that the assembly of the tube 35, the coil 34 and the metal solenoid element is very easily accomplished, as the coil 34 may be slipped into position partly surrounded by the metal solenoid element, and the tube 35 can then be slipped endwise through the passages provided in the end portions of the solenoid element and through the central passage in the coil, after which it is fixed in position by the screw 44. The terminal wires 47 and 48 of the coil extend through the passages provided for them in the metal element so that the coil is prevented from turning and the wires are reinforced.

Within the solenoid tube 35 is the solenoid plunger 24 that has already been mentioned. This plunger has a central body portion of iron or other magnetic material on the end of which is a striking pad 53 of leather or similar material, held in place by a cap piece 54 of brass or any other suitable metal. At the other end of the body portion of the plunger there is a guide end 56 preferably formed by spaced plates 57 held in place by a screw 58 and holding between them a pad 59 of suitable fibrous material. The plates 57 and the pad 59 are shaped to have a plurality of comparatively smooth guiding surfaces that slide or rest on a guide tube 60, the plates 57 and the pad 59 being preferably substantially triangular in shape. The tube 60, which may be of brass or other non-magnetic substance, is secured in the end portion 37 of the solenoid element 38 in axial extension of the tube 35 by means of a set screw 61. This tube has a slot in the end which fits within the end portion 37, its slot corresponding in position to slot 42 in end portion 37. The interior diameter of the tube 60 is such as to snugly receive the triangular pad 59 so as to prevent any misalignment of the axis of the plunger with respect to the axis of the solenoid coil. The body portion of the plunger is preferably of modified hexagonal form, or equivalent shape, with the edge portions rounded so as to give several substantial points of contact or sliding engagement with the tube 35 with which it forms a rather close but sliding fit.

In the outer end of the tube 60 is secured an interiorly threaded ring 63, a pin 64 securing the parts 60 and 63 together. A threaded plug 65 engages the interior threads in the part 63 in such a way that the plug 65 may be moved axially with relation to the tube 60. The inner end of the plug 65 is recessed as indicated at 66, a suitable soft pad 67 being held in this recess so as to form a stop against which the outer end of the solenoid plunger can strike and which absorbs the shock when the plunger returns to its normal position of rest. Threaded into the plug 65 is a screw 68, the head 69 of which is adapted to clamp an L-shaped strap 70 against the end of the plug 65, it being understood that the strap 70 is provided with a hole through which the screw 68 freely extends, this strap also having an elongated slot 71 through which the pin 64 projects, the pin thus engaging the strap 70 so as to prevent it from rotating and holding its pointed end 72 in cooperative association with scale markings 73 that give an indication of the normal position of the solenoid plunger and consequently an indication of the volume of sound to be produced. A nut 74 is threaded on the plug 65 and holds this plug in its desired position of adjustment.

The plunger 24 of the solenoid is held back normally against the soft abutment pad 67. For this purpose a spring 76, preferably spiral in form, is provided around the solenoid plunger, one end of the spring being centralized by means of the end of the tube 35 which projects a little distance out into the tube 60 as shown in Fig. 8. The other end of the spring bears against one of the plates 57, the diameter at this end of the spring being somewhat less than at the left-hand end and only slightly larger than the plunger diameter in order that the spring can be compressed to a very small overall length when the coil is energized and the plunger is drawn to the left. The normal position of the plunger, against the abutment pad 67, is shown in full lines in Fig. 8. However, when the coil 34 is energized the pull of the solenoid causes the plunger to be moved to the left past the dotted line position in Fig. 8, to strike its objective; but it is, however, instantly withdrawn from striking engagement with the objective to the position shown in dotted lines in Fig. 8 where it remains until the coil is de-energized. It is withdrawn to this position from contact with the chime tube because the total length of the iron body portion of the plunger is so coordinated with the total length of the iron solenoid core element as to provide a coil energized position in which the striking end of the plunger is just a little distance away from the objective, in this case a chime tube. When moving to the left from its normal position of rest shown in full lines in Fig. 8, the solenoid plunger by reason of its own inertia travels past this centralized position to which it is returned by the continued flow of current through the coil, but the centralizing effect of the coil current prevents the plunger from striking twice or from holding against the objective and interfering with the free vibration of the chime. The normal position of rest can be adjusted by suitable manipulation of the nut 74, the plug 65 and the screw 68, and adjustment of this normal position has the effect of varying the power of a blow, as the distance from normal position to the objective is varied. The loudness of the notes sounded by a chime tube is therefore under complete control. Reference has also previously been made to the adjustment of the position of each chime tube by means of the adjusting screw 29, and it will now be clear that such adjustment of the chime tube position permits its location exactly the right distance away from the centralized position of the solenoid plunger to prevent the plunger from being held against it.

The several solenoids are secured to the rear side of the supporting plate 17, which is provided with the proper number of holes 79, herein shown as four in number for a four-chime apparatus. These holes 79 are of such size as to snugly receive the cylindrical ends 80 of the metal solenoid elements which, it will be noted, project out a little distance from the plane surface 81 of the core element, that abuts the side of the plate 17. Two attaching screw holes 82 are provided in this portion of each metal core element which receive the holding screws 84 passing through the supporting plate 17. A threaded passage 85 is also provided at this end of the solenoid core element for receiving the threaded end of the adjusting screw 29.

The supporting plate 17 preferably forms the front plate of an outlet box or housing designated generally 87. This may be recessed in the wall 88 of a building in which the apparatus is located, so as to leave only a small portion of the outlet box projecting from the surface of the wall. Outwardly projecting angle iron pieces 89 provided on the two vertical sides of the box, for example, may serve to fasten the box to the wall as shown in Fig. 3. Preferably a cover plate 90 is detachably supported on the sides of the box by means of a suitable slip joint connection with projecting screws 91, this cover 90 hiding the upper ends of the tubes, presenting a pleasing appearance and also forming a protection. The supporting plate 17 is rearwardly flanged at 93 along its upper edge, the flange thus provided resting on the forward side of the top wall 94 of the box and forming a support for the entire mechanism held by the plate 17, when the latter is in its normal position closing the open side of the box.

The plate 17 is preferably hinged so as to swing about a vertical axis, being connected by suitable pivot connections adjacent one vertical side of the plate 17 and the forward outer corner of the box. A suitable support providing for this hinging or swinging movement of the plate 17 is shown in Figs. 2, 3, 17 and 18, it being noted that a pin 95 fixed to the box 87 projects up through a slot 96 arranged at an angle to the front side of the plate 17 so that the plate 17 can be swung open and at the same time move a little distance laterally and forwardly with relation to the box during this opening movement. Directly below the pin 95 and slot 96 is a similar pin and slot arrangement provided by a movable pin 97 pressed downwardly by a spring 98 so as to engage a slot 99 in the horizontally extending bottom flanged portion 100 of the plate 17. The cover plate 90 may be readily removed, and when it is out of the way the supporting plate 17 and the mechanism on it can be swung out into a position where the parts of the apparatus are readily accessible for adjustment or repair or other reasons.

The four solenoids of the chime apparatus are energized in some predetermined sequence by means of automatically operable switches under the control of an electric motor. As herein shown this motor is of the shaded pole induction disk type which forms a very desirable drive for apparatus of this sort. This motor is of novel construction, as apparent from Figs. 3 to 6, 13, 14 and 15, and comprises a shaded pole induction magnet embodying the magnet coil 102, provided around the laminated core element 103 which preferably is constructed of a number of substantially L-shaped laminations interleaved at their ends and providing spaced pole pieces 104 on which there are suitable shading rings 105. The various laminated plates or pieces of the core 103 are secured directly to two parallel supporting plates 107 and 108, each of which has outwardly projecting tabs or ears 109 preferably formed as integrally stamped-out portions of the plates themselves. These outwardly extending ears or projections are arranged in pairs on each plate, and a pair of projections on one plate are arranged exactly opposite a pair of projections of the other plate. These projections hold the laminated metal strips of the core between them, being provided with holes that receive screws 110 projecting also through holes at the corner portions of the lamination strips. These screws 110 extend parallel to the supporting plates so they are readily accessible, and connect the core laminations directly to the plates in a manner that prevents any misalignment and insures an exact positioning of the plates and core pieces. At suitable points spaced from the core laminations, spacing studs 112 and a bar 113 space the plates a corresponding distance apart.

The plates 107 and 108 are preferably sheet metal stampings, the various projections, ears, tabs and holes with which they are provided being stamped or similarly formed in the metal preferably in a single operation. The ends of the plates 107 and 108 that are adjacent the supporting plate 117 are integrally flanged and are footed as indicated at 115, these feet abutting against the inner side of the supporting plate 17 to which they are secured by suitable screws 116 as shown in Fig. 6 for example.

Operating between the spaced pole faces 104 of the electromagnet is a rotatable disk 119, suitably secured on a shaft 120. This shaft is mounted at its ends by means of ballbearings held in ballbearing supports 121 that are preferably threaded in the plates 107 and 108, the portion of the plate 108 in which its ballbearing support 121 is provided being a bracket member 123 fixed to the plate in any suitable manner. An adjusting nut 124 provided on each of these bearing supports 121 provides for accurate adjustment of the bearings and definitely locates the shaft 120 in such a way as to prevent any vibrational noise that would otherwise probably be generated by the motor when energized with alternating current. Vibrational noises of course would be extremely undesirable in a musical instrument of this character.

Provided on the shaft 120 preferably between the outer side of the plate 108 and the bracket 123, is a small driving pinion 126 engaging and driving a gear 127. Fixed to the gear 127 is a pinion 128 that engages and drives a gear 129 fixed to a gear 130 and rotatable about an axis 131. Gear 130 meshes with and drives a wide gear 132 which is fixed to a stop shaft 134. This shaft operates rather slowly due to the gearreduction between the comparatively rapidly moving shaft 120 and shaft 134, and on this shaft 134 are series of projections that control switches which in turn control the solenoid circuits so as to give a predetermined sequence of operations of the solenoids, and thus produce a predetermined sequence of chime sounds. The motor herein described, however, may be used for other purposes where a comparatively cheap, compact and readily assembled unit is desired for comparatively small power outputs. In the particular embodiment in which the motor is herein disclosed, its function is merely the operation of small switches, by the flexing or bending of small switch blades, so it will be understood that the power required of the motor is quite small and is readily obtained at a comparatively slow speed of operation, for even the shaft 120 does not move at the high rotational speeds ordinarily encountered in customary types of motors. High motor speeds in a musical chime or similar apparatus would not be suitable from a commercially practical standpoint.

At the right-hand end of the shaft 134 as viewed in Fig. 3, the latter is provided with two series 136 and 137 of projecting switch operating members or pin projections. The series 136 for example embodies a number of projections 138 on a disk 139 suitably secured to the shaft 134, the projections 138 being adapted to engage a small knob 140 on the flexible switch blade 141. This will perhaps be more apparent from Fig. 6 where the small knob 140' has just been freed by the projection 138', the flexible blade 141' of the switch having opened the circuit of which the switch forms a part. There are four of these switches designated generally 143, 144, 145 and 146 controlling the four solenoids 20, 21, 22 and 23, each controlled by a series of projections, the projections of the several series being so interrelated and associated with one another as to cause the solenoids to be energized in some predetermined definite manner so as to play the notes of the Westminster chimes for example, when the motor driven shaft 134 operates a complete revolution.

In order to vary the tune, there may be eight series of projections instead of four, and the shaft 134 may be moved endwise so as to move the four series of projections shown in Fig. 3 in engagement with the four switches 143 to 146 over to the right from the position shown, and bring the four additional series of projections 136', 137', 138' and 139' opposite the four series of switches 143 to 146. The projections on the series 136' to 139' are so interrelated as to play some other tune than that played by the series of projections first described. Endwise movement of the shaft 134 may be readily effected by a suitable control device embodying a shifting member 150 controlled from the front of the plate 17 so that the latter need not be swung to an open position in order to change the tune played by the chime. A spring 151 which is provided on the shaft member 150 has a projection which yieldingly fits in two opposite depressions 151' (see Fig. 6) to hold the shaft member 150 in either of its positions. Shaft 150 may have a square end accessible from the front, adapted to be turned by a clock key. The shaft 150 turns the eccentric device shown in Fig. 3 to operate through a collar 150' fixed on shaft 134. The gear 132 is wide enough so it will be maintained in mesh with its driving pinion regardless of the position of shaft 134.

The notch in the stroke collar is engaged by the projection 175 of the armature in either of the positions of the shaft, or if desired two separate notched collars may be provided for selective engagement with the projection 175, one of which collars may be so arranged as to have several notches in order that only a part of a revolution of the shaft 134 takes place when one of the four sets of switch operating projections is effected.

Figure 19:
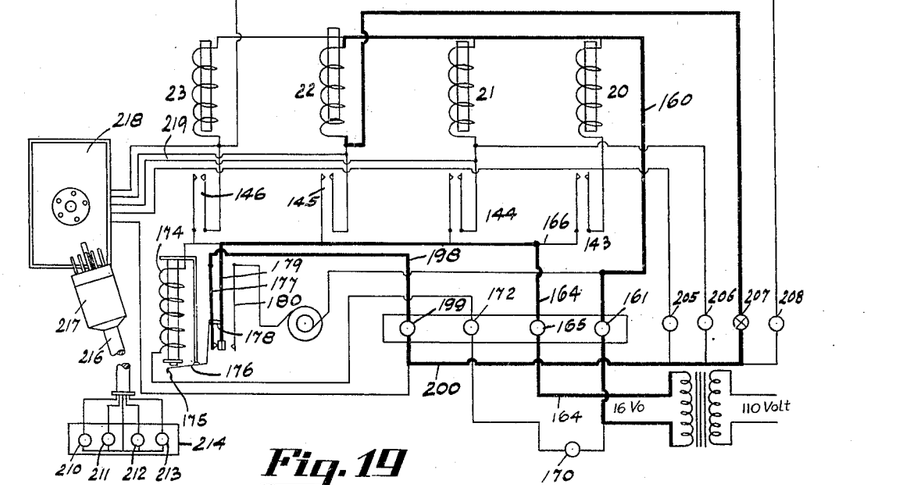
Fig. 19 is a diagrammatic view of the electrical connections, showing one of the individual or selective control switches energized.
Figure 20:
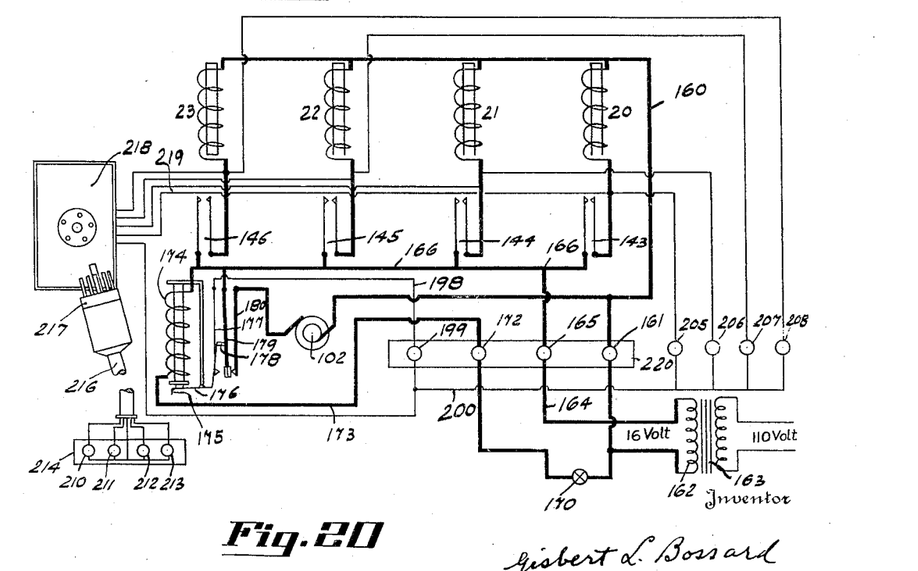
Fig. 20 is a corresponding view of the electrical connections but showing the motor controlling switch closed.
Figures 21, 24:
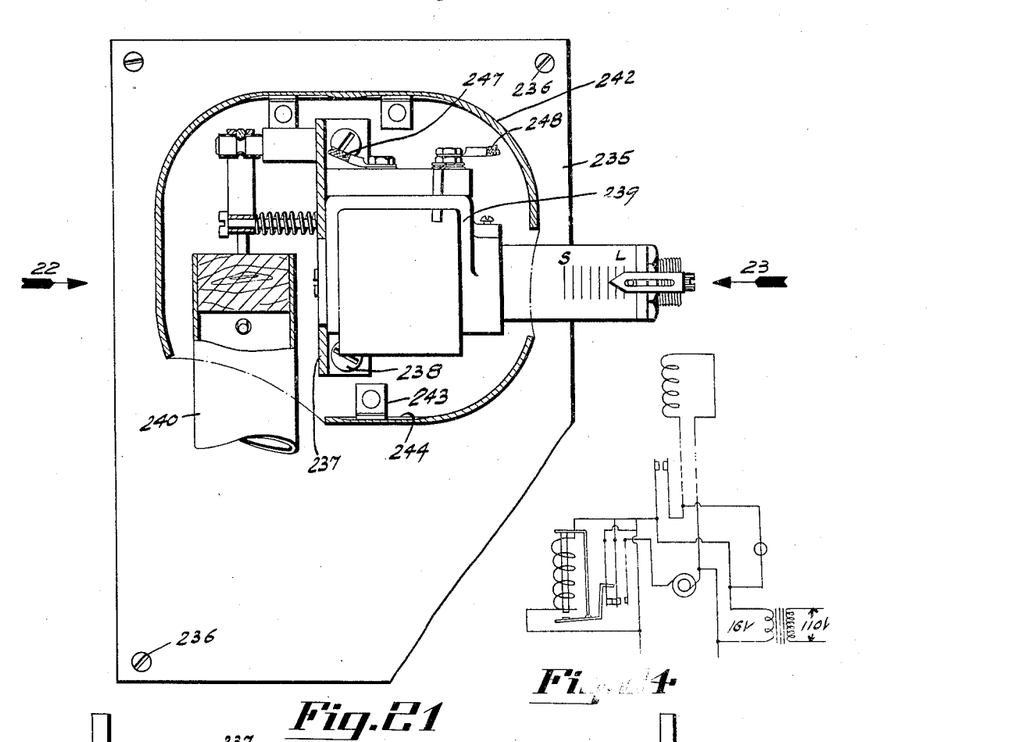
Figure 22:
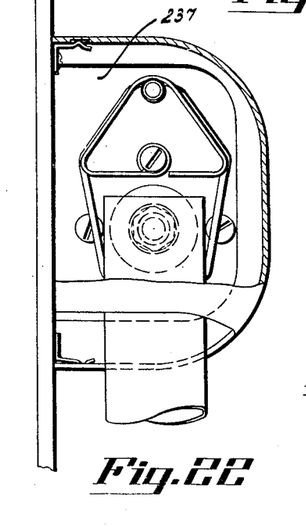
Fig. 22 is a side elevation of the apparatus shown in Fig. 21, partly in section.
Figure 23:
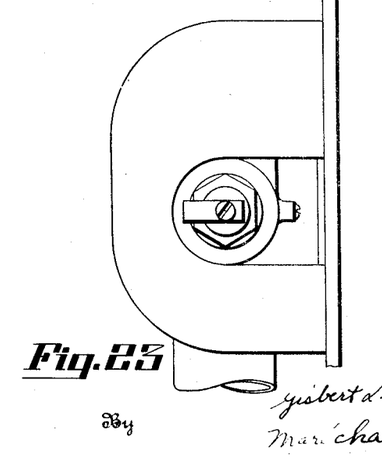
Fig. 23 is a view of the apparatus looking from the right.

The switches 143 to 146, as shown, are mounted on bracket plates 152 and 153. Adjustment is provided, for each switch so as to insure good contact by means of an adjusting screw 154 and a holding spring 155 which maintains the screw in any desired position of adjustment. The screw is threaded in an insulating bushing 156 and the end of the screw bears against a normally fixed contact supporting blade 157, see Fig. 6, each of the switches having a similar adjustment. These four switches 143 to 146 are connected to the four solenoids 20 to 23 as indicated in Figs. 19 and 20, from which it will be seen that one end of each of the solenoids is connected to a lead wire 160 leading to a connection 161 connected in turn to the lower side of the low voltage secondary 162 of transformer 163, the primary of which may be supplied with 110 volt alternating current. The upper side of the secondary is connected through wire 164, connection 165, and wire 166 to the other sides of the several motor controlled switches 143 to 146 and it will be apparent that when any one of these switches is closed by the motor its corresponding solenoid will be energized and the corresponding chime tube struck by the solenoid plunger.

The electric motor is adapted to be started by means of a manually operated push button or control switch 170 which is preferably provided outside the dwelling entrance if the chime apparatus is to be used to give an indication when someone is at the entrance of the building. The winding 102 of the motor coil is connected across the secondary 162 of the transformer when this switch 170 is closed. The switch 170 is provided in a controlling circuit comprising the secondary of the transformer, switch 170, connection 172, wire 173, circuit controlling coil 174, wire 166, connection 165, wire 164 back to the transformer secondary. The switch 170 thus closes a low voltage circuit through the circuit control magnet 174. Fig. 20 shows the energized parts of the apparatus when the switch 170 is closed.

The energization of the magnet 174 has several effects. In the first place it releases a stop or holding means that normally prevents rotation of the shaft 134, a stop projection 175 being provided on the pivotally supported armature 176 in such a way as to be withdrawn from effective engagement with the shaft 134 when the armature 176 is attracted. This armature is substantially L-shaped, having an upstanding portion on which is an insulated projection 178. This projection extends through a slot in a blade 177 and makes contact between the two blades 179 and 180 by pressing against the blade 179. These blades 179 and 180 form a switch for completing the motor circuit, connecting the motor coil 102 across the secondary of the transformer 163, the connections being from the secondary 162 through the wire 164, connection 165, wire 166, blade 179, blade 180, to the motor 102, the return circuit being through the connection 161, back to the lower side of the transformer.

Figure 10:
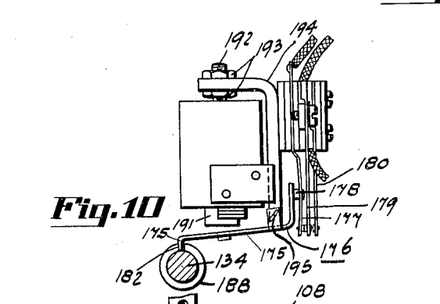
Fig. 10 is a side elevation of the circuit controlling magnet.

The circuit controlling magnet 174 controls the switch that connects the motor across the transformer, and need be energized only for a second or so in order to start the motor, the arrangement being such that if the button 170 is released after only being pressed for a short period the motor circuit will be maintained until the completion of a cycle of operations, after which the motor will automatically stop. This is accomplished by the stop projection 175 that rests, when the motor is stationary, in a slot 182 provided in a collar 183 on shaft 134. The shaft 134 being relieved from the holding force normally provided by the projection 175, is permitted to rotate, being driven by the motor which is energized at the same time the detent or stop projection 175 is withdrawn by means of the circuit controlling magnet and maintaining switch. The collar 183 is loosely mounted on the shaft 134 for limited rotational movements thereon, suitable spring means 185 being provided between the shaft 134 and the collar to urge the collar in a counterclockwise direction on the shaft 134 as viewed in Fig. 10. When the arm projection 175 is in engagement with the notch of the collar, the spring 185 is tensioned, and the parts are shown in Fig. 10, the holding force being transmitted from the collar through the stop pin 187 to the shaft 134, preventing rotational movements of the shaft.

When the circuit control magnet 174 is energized and its armature is attracted so as to withdraw the projection 175 from the notch, the spring 185 immediately swings the collar in a counterclockwise direction a limited amount before any movement of the shaft 134 takes place, after which the shaft is rotated by the motor, the projection 175 riding on the cylindrical surface 188 of the collar and maintaining the armature of the circuit controlling magnet in its attracted position so as to maintain the circuit through the switch blades 179 and 180 until a complete revolution of the shaft 134 has taken place. After a complete revolution of the shaft 134, the notch 182 comes opposite the projection 175 of the armature, and the armature falls, breaking the motor circuit by permitting the flexible blade 179 to move to the left and separate from the blade 180. The motor is thus deenergized and almost immediately afterward the motor armature is positively stopped when the lost motion is taken up between the collar and the shaft.

Figure 11:
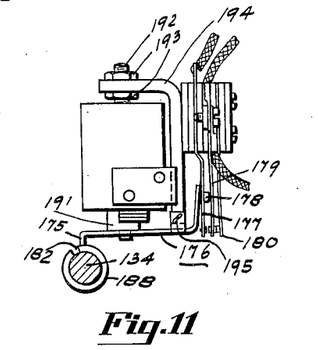
Fig. 11 is a similar view showing the magnet energized.

When the projection 175 is riding on the cylindrical surface of the collar, the armature is preferably engaged against the lower surface 191 of the core of the circuit controlling magnet as shown in Fig. 11, so that all vibrational movements of the armature are prevented. This prevents any noise or hum that might otherwise be caused by the alternating current. In order that this engagement between the armature and the core surface 191 may be perfectly snug, the armature is adjustably mounted by means of the threaded screw 192 and the nuts 193 that locate the screw with relation to the supporting bracket 194. This bracket 194 is fixed to the bar 113 and the lower end of the bracket pivotally supports the armature preferably by means of a cotter pin 195. Bodily adjustment of the circuit controlling magnet with relation to its armature support and with relation to the shaft 134 may therefore be readily effected in order to provide for abutting engagement of the armature with the core surface 191 when the projection 175 is in engagement with the cylindrical surface 188 of the notched collar.

Figure 12:
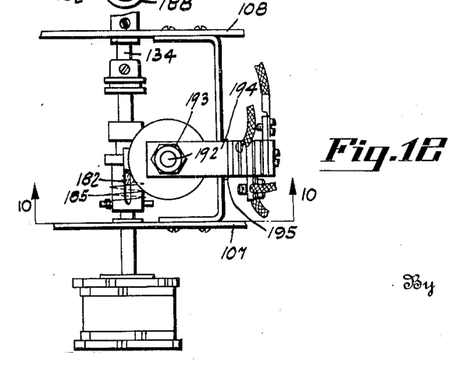
Fig. 12 is a top plan view of the circuit controlling magnet and its associated mechanism.

The shaft 134 is bodily adjustable to the right from the position shown in Fig. 12 in order to change the tune played by the chime, as previously referred to. The projection 175 is therefore made rather wide so as to engage with the notch 182 regardless of the position of adjustment of the shaft 134.

Referring now more particularly to Figs. 19 and 20, it will be noted that when the motor controlling switch 170 is closed, as shown in Fig. 20, the circuit controlling magnet 174 is energized which relieves the stop from the notch on the shaft collar and closes the switch blades 179, and 180, connecting the motor 102 across the secondary of the transformer. The motor controlled switches 143 to 146 being connected in series with the solenoid coils 20 to 23 and across the secondary of the transformer will cause the successive energization of the solenoids as these several switches are operated by the pin projections controlled by the motor. After the completion of a cycle of operations, that is, after the completion of a full revolution of the shaft 134, the device will automatically stop, as the armature will break the motor circuit and also positively stop the rotation of the shaft 134. When the magnet or coil 174 is energized it has this additional effect. It breaks the circuit normally provided between the blade 179 and the blade 177, through which the insulated nose 178 extends. These blades 177 and 179 are provided in a circuit from the transformer secondary through lead 164, connection 165, lead 166, blade 179, blade 177, lead 198, to connection 199, which is connected to the normally live wire 200 extending to additional switches, preferably manually controlled and provided at desirable points for selectively and manually controlling the operation of the several solenoids. These switches are arranged as to connect this normally live wire 200 to one or more of the solenoids. The return circuit from the solenoids is through the lead 160, connection 161, back to the transformer. It will be noted that the blades 177 and 179 form a part of the connections from the transformer to the normally live wire 200 so that when the blade 179 is pressed over to the right away from the blade 177 the wire 200 will no longer be energized, as the circuit to it will be broken. This insures that the several additional switches for selectively and individually controlling the solenoids cannot affect the apparatus as long as the motor is in operation that is, as long as the armature of the circuit controlling magnet is held in the position shown in Fig. 20. When the motor is stopped, however, the connections from the transformer secondary to the normally live wire 200 will again be completed in order that at any time the solenoids may be controlled selectively or individually, as desired.

These individual or selective switches may be placed at a convenient place or places, and may be arranged so that one switch controls one solenoid, or a switch may control a plurality of solenoids at the same time to cause a plurality of the chime tubes to be struck simultaneously. Thus the four switches 205, 206, 207, and 208 may be connected to the normally live wire 200 and to the four solenoids 20, 21, 22, and 23 respectively. The switches 205 and 206 may be arranged at the back door and side door of the building, for example, and the switches 207 and 208 may be arranged at other convenient points to form a call device so that a particular chime tube or tubes can be sounded from a remote point. Fig. 19 shows the various connections and circuit paths when the selective switch 207 is closed.

In addition to the individual and selective switches 205 and 208 arranged at various scattered points in the building, the chimes may be controlled by a series of individual switches 210, 211, 212 and 213, arranged in a common supporting member 214 so that the chime tubes may be played, without energizing the motor, and merely by pushing the individual buttons of the switches 210 and 213 to give a pleasing sequence of notes. These switches 210 and 213 are connected by a cable 216 to a terminal plug 217 adapted to be plugged into a receiving socket 218 that may be conveniently located in the wall of the building and that is electrically connected to the chime apparatus by wires 219 extending to the several solenoids 20 to 23. The switches 210 to 213 may energize the solenoids in a desired manner by connecting them to the normally live wire 200 providing of course the switch blade 177 is engaged with the blade 179. The switch blades 177 and 179 form an interrupting or prevention means preventing the chimes from being affected by the several individual and selectively operated switches, so that if someone is at the door and wants admission and after starting the motor, the predetermined sequence of notes as controlled by the motor will not be interrupted by one of the individual switches.

The several connections 161, 165, 172 and 179 from which the low tension service wires extend are provided on an insulating block 220, these connections being preferably metal plates secured to the block and electrically connected to the internal wiring of the apparatus and adapted to be readily connected by the screws 221 to the several wires that extend outside of the chime housing or box. This block 220 is preferably mounted on two outwardly projecting straps 223 that are preferably stamped out integrally on the plate 108. The plate 108 may also have additional straps integrally stamped out of the metal such as the strap 224 through which the several wires leading to the circuit controlling magnet extend, as shown in Fig. 3. 225 indicates another outwardly projecting strap portion that forms a support for a friction brake that rubs on the side of one of the gears in order to control the speed of operation of the motor. This friction brake as shown best in Fig. 4, comprises a flexible spring blade 226 secured at 227 to the bracket 225. In the bracket is threaded a screw 228 having a spring 229 that maintains the screw in any desired position of adjustment. The projecting end of the screw engages a side of the flexible blade 226 and presses it with controlled force to the left so that the friction pad 230 carried by the upper end of this blade is pressed against the smooth side of the gear 129. By means of this brake the motor is given a range of speed adjustment so that the chime notes can be struck in rapid succession, or comparatively slowly, and so that variation in voltage of the supply system may be compensated for. Furthermore the spring brake has the effect of preventing reverse movements of the motor armature such as might unwind the spring 185 at the end of a cycle of operations to such an extent that the stop notch in the collar 183 would not spring past the armature projection 175 when the armature is attracted.

The plates 107 and 108 in addition to the several attaching projections and supports with which it is formed, are provided with suitable holes or openings properly arranged so as to support the several rotating shafts, and as the holes are punched when the projections are bent up, the proper association of the armature with relation to the magnet core will always be assured, and no particular care need be used in assembling the apparatus, the parts being compelled to assume their proper relationship.

Figure 13:
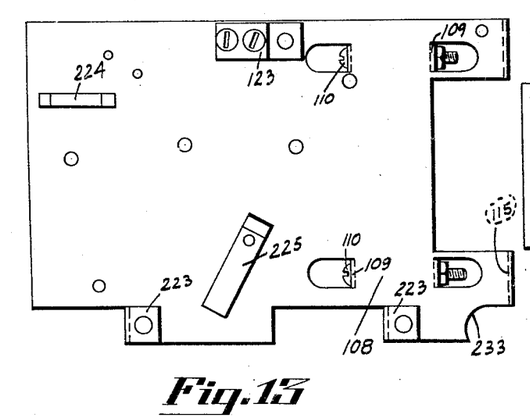
Fig. 13 is a detailed view of one of the motor supporting plates.
Figure 14:
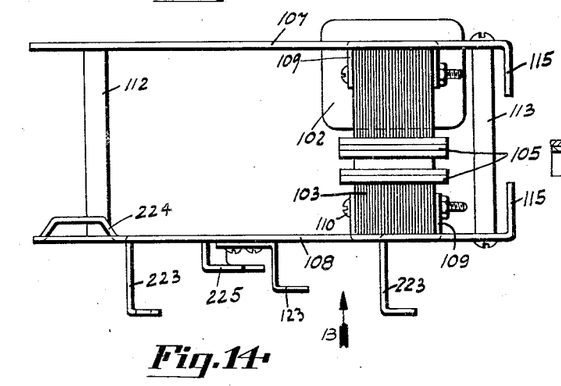
Fig. 14 is a top plan view of the induction disk magnet and its supporting side plates.
Figure 15:
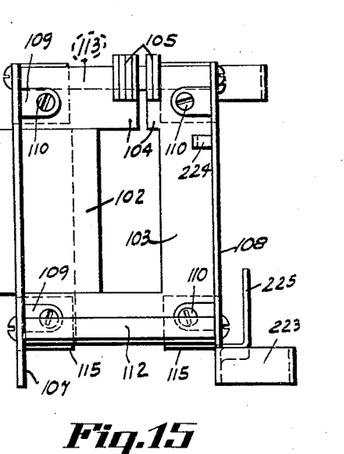
Fig. 15 is a rear elevation of the parts shown in Fig. 14.

It will be noted from Fig. 13 that the plate 108 is provided with a curved notch 233 at one corner, and the plate 107 is similarly notched so as to hold an insulating tube 234, as shown in Fig. 6. This insulation tube extends across the rear side of the supporting plate 17 and conduts the wires from the several connections on the contact block 220 over to the other side of the apparatus so that they may then be extended out through an opening in the side of the outlet box or housing.

Figs. 21 to 24 show a modified form of construction in which the chime tube and its solenoid can be supported in a desired location, while the controlling means for the solenoid may be at some remote point. As shown in these figures, 235 designates a support that may be mounted on the wall of a building by means of suitable supporting screws 236 or in any other manner. This support has fixed to it a supporting plate 237 that projects outwardly, and that may be mounted in position by means of suitable attaching screws 238. The supporting plate 237 forms a support for the solenoid designated generally 239. This solenoid is similar in construction to the solenoid 23 that has previously been described, and the manner in which this solenoid 239 is supported on plate 237 is also similar to the manner in which solenoid 23 is supported on its plate 17. The chime tube 240 associated with the solenoid 239 is mounted by supporting means similar to those previously described and provided on the other side of the plate 237. The upper end of the chime tube and the solenoid may be covered or partly covered by means of a detachable dome-like shield 242 that may be held in place by spring arms 243 engaging grooves or notches 244 provided in the shield 242.

The wires that extend from the solenoid 239, that is the wires 247 and 248 may preferably extend to a switch 249 that is adapted to be automatically controlled by the electric motor 250 of the induction disk type and preferably made just like the motor previously described except that its supporting plates are not connected directly to the rear side of the plate in which the chime tube and the solenoid tube are fixed, but on the contrary are arranged at some convenient distant point, in the basement for example. The single chime 240 may be controlled in any desired manner. It may be struck a predetermined number of times with different timed spacings between successive blows, by means of the motor 250, that is controlled in the same way as in the instance first described. The solenoid 239 may also be arranged so as to be struck by operation of the manually controlled selective switch 252 that causes a single blow to be struck without energizing the motor.

While a single chime has been shown associated with the single solenoid 239, it will be obvious that any desired number of solenoids and chime tubes may be used, and adapted to be controlled from a remote point in a similar manner.

While the forms of apparatus herein described constitute preferred embodiments of the invention, it is to be understood that the invention is not limited to these precise forms of apparatus, and that changes may be made therein without departing from the scope of the invention which is defined in the appended claims.

What is claimed is:

1. An electrically controlled chime of the class described comprising an electric motor having a rotatable armature, means for energizing said motor, a plurality of individual relatively adjustable switch operating disks operably connected to said armature, each of said disks having a series of switch operating projections, means securing said disks together in various relative positionings, a switch for each series of projections, a solenoid coil for each switch, a plunger for each solenoid coil, and a sounder for each plunger.

2. An electrically operated chime of the character described comprising a plurality of solenoid coils, a plunger for each said coil, a chime adapted to be struck by each said plunger when its respective coil is energized, a manually controlled switch, an induction disk electric motor controlled by said switch, and switch means controlled by said motor for automatically controlling the energization of said coils in a predetermined manner.

3. A chime of the class described comprising a chime sounder member, a supporting plate, a rigid member having a supporting connection to said chime sounder member, means hanging the upper end of said rigid member from said plate, adjustment means mounted on said plate and connected to the lower end of said rigid member, and means for striking said chime sounder member.

4. An electrically operated chime of the character described comprising a series of solenoid coils, a plunger for each coil, a chime for each coil adapted to be struck by its plunger when the coil is energized, a manually controlled switch, an electric motor energized when said switch is closed, an automatically operated switch for each coil, means operated by said motor for closing said automatically operated switches in predetermined sequence, individual means for selectively energizing a coil, and means for rendering said individual switch means ineffective when said motor is operating.

5. In a device of the character described, an electric motor, a switch which when closed causes the energization of said motor, switch means automatically operated by said motor, electrical elements controlled by said switch means, individual switch means for controlling said electrical elements, and means for rendering said individual switch means ineffective when said motor is operating.

6. An electrically controlled chime of the class described comprising a supporting plate, chime sounder means supported on said plate, a frame mounted on said plate and comprising interconnected parallel frame members having integral extensions abutting and attached to said plate, an armature rotatably mounted in said frame members, a shaded pole induction magnet supported by said frame members and cooperatively associated with said armature, rotatable switch operating means mounted on said frame members and operated by said armature, switch means operated thereby, and solenoid means controlled by said switch means for operating said chime sounder means.

7. An electrically controlled chime of the character described, comprising an induction disk motor having a shaded pole induction magnet and a rotatable armature operable between the pole faces thereof, a shaft supporting said armature, ball bearing supports for opposite ends of said shaft, a plate supporting one of said ball bearing supports, a second plate parallel to said named plate, an extension bracket on the outer side of said plate and supporting the other ball bearing support, a second shaft rotatably supported by said plates, gear means on the outer side of said second plate interconnecting said shafts, switch means operated by said second shaft, solenoid means operated by said switch means, and chime tubes operated by said solenoid means.

8. An electrically controlled device of the character described comprising an open-sided box, a supporting plate vertically hinged adjacent one side thereof for swinging movements on said box, said supporting plate having a rearwardly extending top flange normally overlying the top of the box so as to support the entire weight of said plate when said plate is in a normal position closing the open side of the box, an electric motor supported on said plate, chime sounder means supported on said plate on the opposite side thereof from said motor, and means operated by said motor for striking said chime sounder means.

9. An electrically controlled chime of the character described comprising chime sounder means, striking means for said chime sounder means, a rotatable member having a plurality of series of projections for controlling the striking means in different predetermined manners, and means adapted to be quickly adjusted for shifting said series of projections to render one operative and the other inoperative.

GISBERT L. BOSSARD.